United States Patent [19]

Koster

[11] Patent Number: 4,959,143
[45] Date of Patent: Sep. 25, 1990

[54] OIL SPILL RECOVERY VESSEL

[76] Inventor: Chester A. Koster, 13120-D La Jolla Cir., La Mirada, Calif. 90638

[21] Appl. No.: 498,726

[22] Filed: Mar. 26, 1990

[51] Int. Cl.$^5$ ............................................. C02B 15/04
[52] U.S. Cl. .................................. 210/242.3; 210/923; 114/30
[58] Field of Search .................. 210/242.1, 242.3, 776, 210/923; 114/28, 29, 30

[56] References Cited

U.S. PATENT DOCUMENTS

| 631,637 | 8/1899 | Haslam | 114/30 |
|---|---|---|---|
| 1,138,463 | 5/1915 | Eastman | 114/30 |
| 4,348,282 | 9/1982 | Fries et al. | 210/242.3 |
| 4,889,447 | 12/1989 | Stronje | 210/923 |

FOREIGN PATENT DOCUMENTS 3728937 3/1989 Fed. Rep. of Germany.

Primary Examiner—W. Gary Jones
Assistant Examiner—Christopher Upton
Attorney, Agent, or Firm—Edgar W. Averill, Jr.

[57] ABSTRACT

An oil spill recovery vessel for removing oil spills on the water surface and storing the collected oil. The vessel has a starboard hull half and a port hull half which expand away from one another and a skimmer is deployed between the two hull halves. The hull halves also function to separate the skimmed oil from water and to store the skimmed oil. Each hull half is provided with a diesel engine, propeller and a rudder to facilitate maneuvering the vessel.

15 Claims, 4 Drawing Sheets

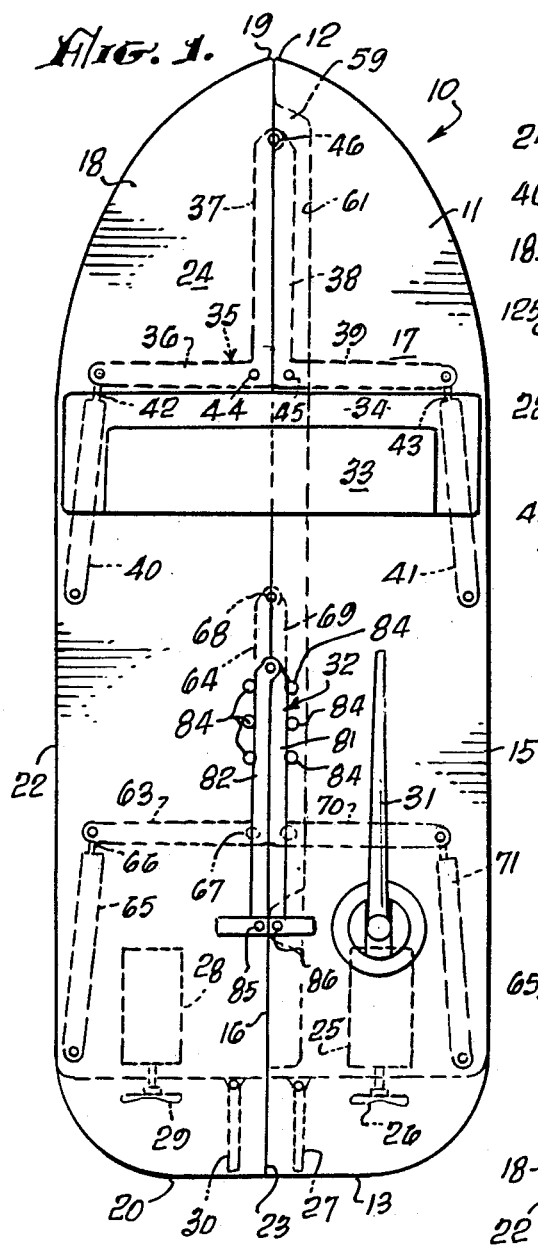
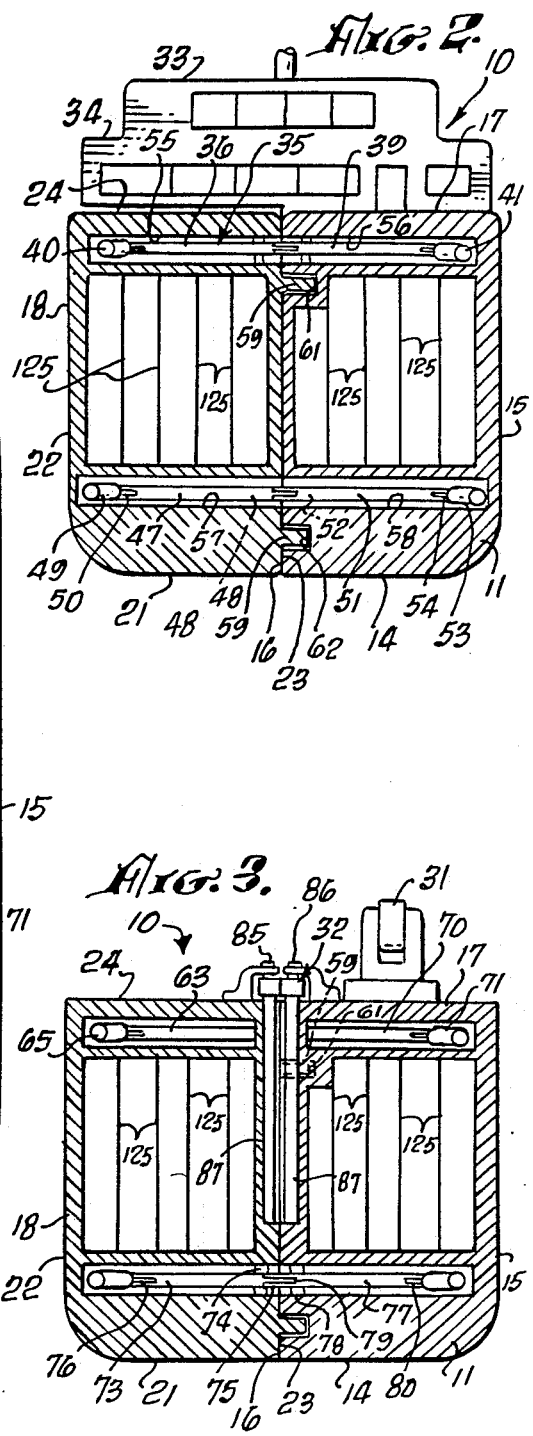

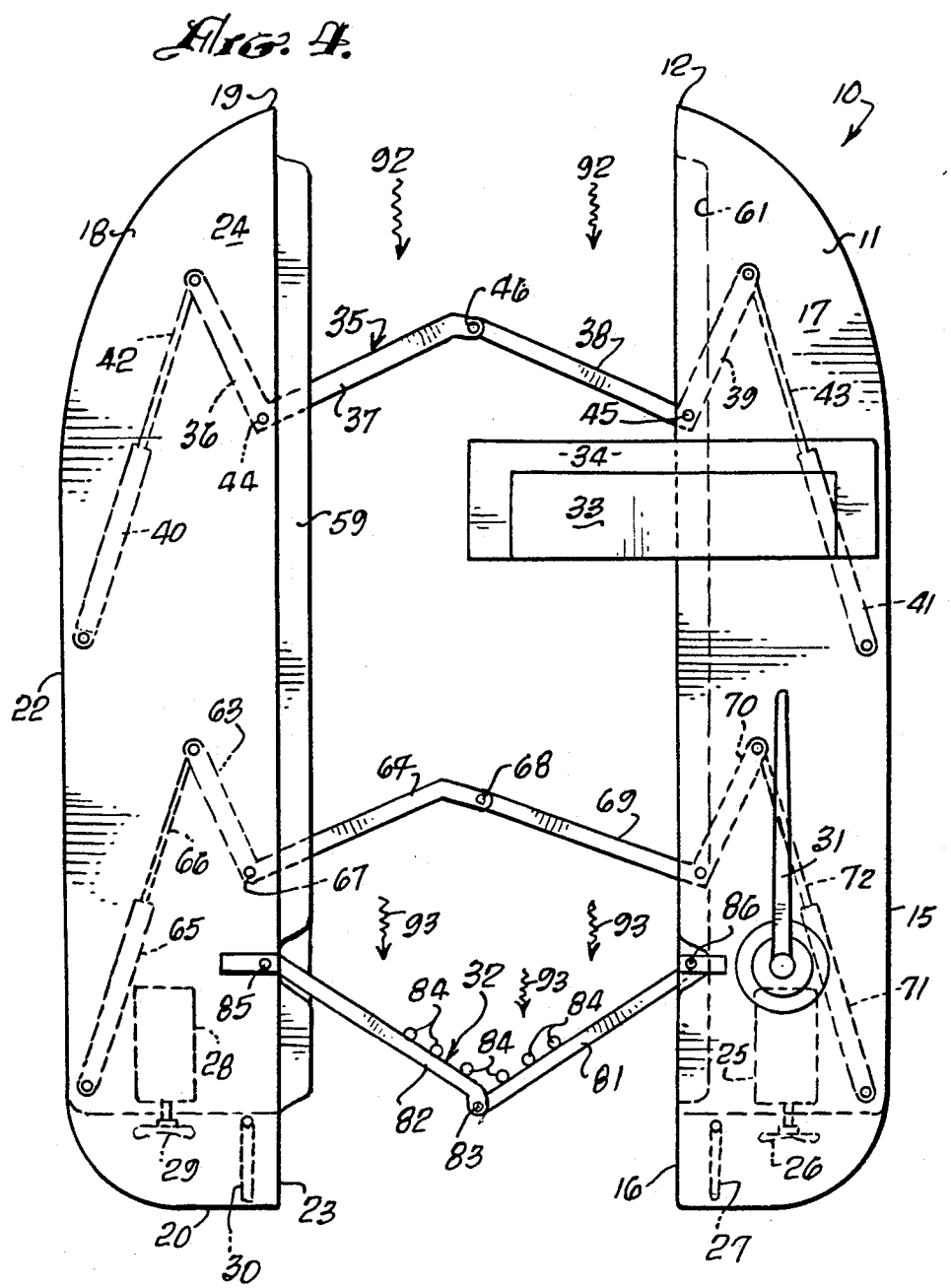

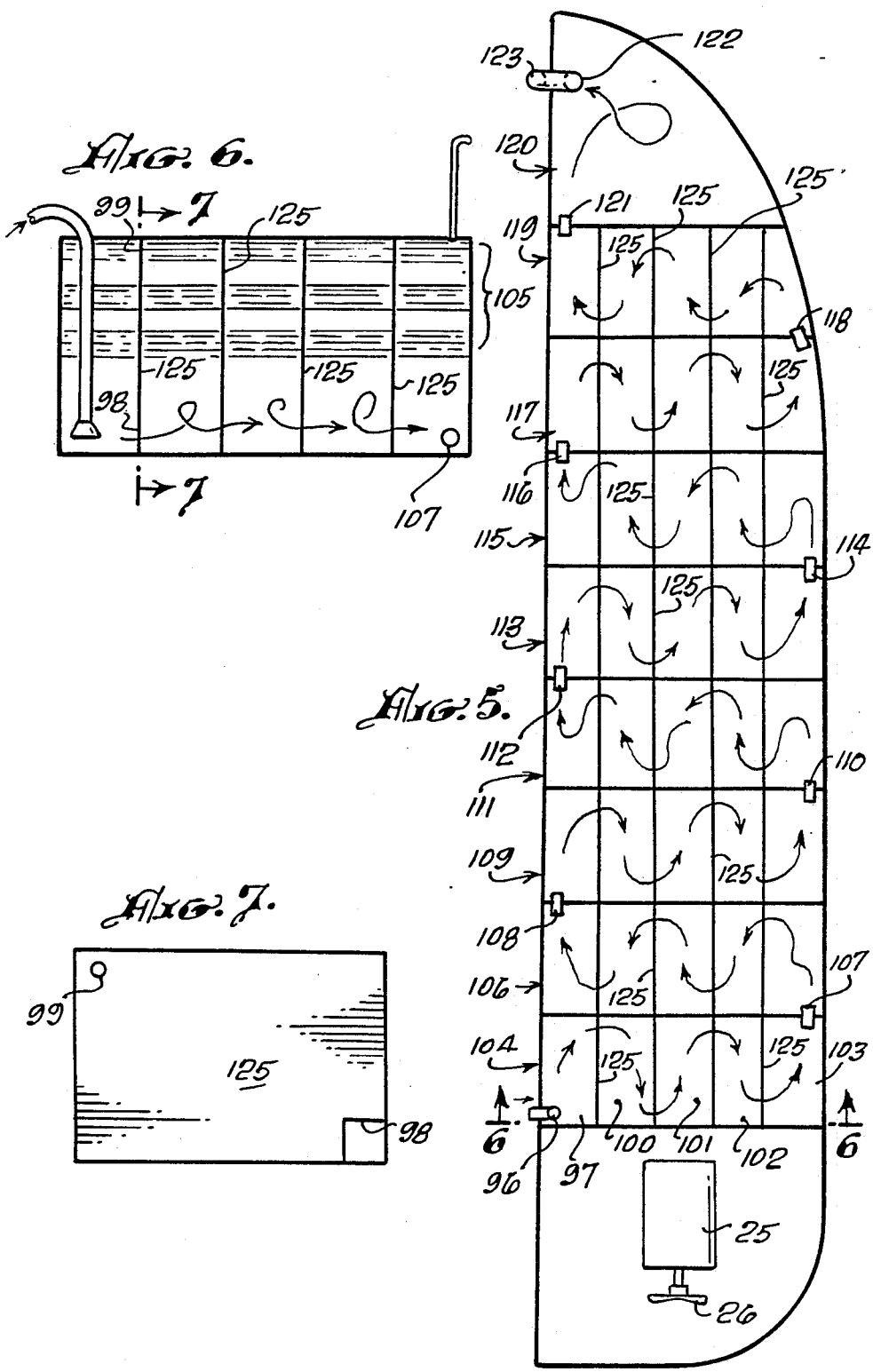

OIL SPILL RECOVERY VESSEL

BACKGROUND OF THE INVENTION

The field of the invention is oil spill recovery, and the invention relates more particularly to the removal of large volume oil spills from the surface of the ocean or other large bodies of water.

The potential danger to the ecology of massive oil spills has become painfully evident in recent years. In spite of the recognized problem, no system has been devised which is capable of picking up large volumes of oil from the surface of the ocean, bay or the like. An absorption oil skimmer is disclosed in U.S. Pat. No. 3,546,112 which utilizes a sponge which is rotated at the water surface. While such approach is undoubtedly practical for small spills, it is totally inadequate for the large type of spills which are of the most damaging concern to the ecology. A floating oil skimmer barge is disclosed in U.S. Pat. No. 3,708,070, and the device is again limited to small volume spills. It would also be inappropriate for use in the open ocean which is the most logical area for a large volume spill. Another spill oil retriever is shown in U.S. Pat. No. 4,033,876 and this, again, is limited to small volume spills. A similar low volume collector of surface oil is shown in U.S. Pat. No. 4,100,072. This device would not be useful for a large volume ocean oil spill. Perhaps the most ambitious approach is shown in U.S. Pat. No. 4,348,282 where an ocean-going vessel is disclosed which is hinged at the stern. In an open condition, it forms about a 90° angle. However, in the open, moderately rough ocean, such a design would be likely to cause a great deal of turbulence as a result of wave action in this closed area not to mention strain on the vessel. Lastly, an oil skimming, floating hull is disclosed in U.S. Pat. No. 4,391,708. It utilizes a central hull part with a bulge and deflecting wings to create vortices.

To date, there has been no vessel which is capable of dealing with the potentially large volume oil spills caused by a leak in a super tanker or other large volume oil transportation vehicle.

SUMMARY OF THE INVENTION

It is an object of the present invention to provide an oil spill recovery vessel for removing large volume oil spills from the surface of the ocean which includes moderately rough water and which can be operational immediately without support systems.

The present invention is for an oil spill recovery vessel comprising a first hull half including a bow, a stern, a bottom, an outer side and an inner side, said first hull half being watertight and including propeller, rudder and diesel engine means and including means for separating oil from water and for expelling water therefrom. A second hull half (a mating duplicate of the first half), is movably connected to the first hull half and the second hull half also includes a bow, a stern, a bottom, an outer side and an inner side and means for separating oil from water and for expelling water therefrom. Expandable connection means are affixed to the first hull half and to the second hull half. Such means have a contracted position wherein the first and second hull halves are held tightly together, and the ship operates as a normal ocean going vessel, and an expanded position where the hull halves are completely separated so that water may pass between the two hull halves thus allowing it to operate in moderately rough water. Deployable oil skimming means are positionable between the first and second hull halves when they are in an expanded position. The skimming means have a water and oil inlet area located between the hull halves and at least one water and oil outlet located within the first hull half or the second hull half. Preferably, the hull halves have a labyrinth passageway therein with a water exit near the front of each hull half in the interior portion so that any oil not separated in the labyrinth may be subjected to the skimming means a second time. A vessel of a substantial size, such as 20,000 barrels, is contemplated so that it may operate for an extended period of time without the need for interruption for off loading of collected oil. When not operating as an oil recovery vessel, it can be used as a small tanker. Thus, it has a dual purpose.

BRIEF DESCRIPTION OF THE DRAWINGS

FIG. 1 is a plan view of the oil spill recovery vessel of the present invention showing the expandable connection means in phantom view and showing the vessel in its compact ocean-going condition.

FIG. 2 is a cross-sectional view taken along line 2—2 of FIG. 1.

FIG. 3 is a cross-sectional view taken along line 3—3 of FIG. 1.

FIG. 4 is a plan view showing the oil spill recovery vessel in hydraulically operated, expanded position.

FIG. 5 is a plan view of the starboard side of the vessel of FIG. 1 showing the oil and water separation labyrinth therein.

FIG. 6 is a cross-sectional view taken along line 6—6 of FIG. 5.

FIG. 7 is an enlarged view of one of the baffle plates of the vessel half of FIG. 5.

DESCRIPTION OF THE PREFERRED EMBODIMENTS

Figure 8:
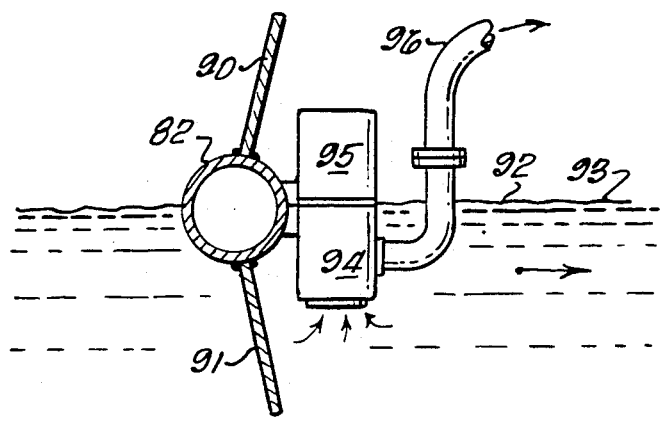
FIG. 8 is an enlarged view of the self adjusting, floating skimming means of the vessel of FIG. 1.

The oil spill recovery vessel of the present invention is shown in plan view in FIG. 1 and indicated generally by reference character 10. Vessel 10 has a starboard hull half 11 which has a bow 12, a stern 13, a bottom 14, shown in FIGS. 2 and 3, an outer side 15, an inner side 16 and a deck 17.

Vessel 10 also has a port hull half 18 which has a bow 19, a stern 20, a bottom 21, an outer side 22, an inner side 23 and a deck 24.

Starboard hull half 11 has an engine 25, a propeller 26 and a rudder 27. Similarly, port hull half 18 has an engine 28, a propeller 29 and a rudder 30. The starboard hull half has a crane 31 which is used to deploy the floating skimmer indicated generally by reference character 32. Floating skimmer 32 rests on decks 17 and 24 when the hull halves are in the contracted position as shown in FIG. 1. A bridge 33 and a flying bridge 34 are supported by the starboard hull half, as shown best in FIG. 4, and has four sets of spreader arms, upper and lower arms forward and upper and lower stern arms. These are indicated generally be reference character 35 and include a set of forward upper spreader arms indicated by reference characters 36. These are controlled by a pair of upper hydraulic cylinders 40 and 41 which have piston rods 42 and 43. As shown best in FIG. 4, when the hydraulic cylinders are extended, arms 36 and 37, which are integral, pivot at pin 44 and force the port hull half outwardly with respect to the starboard hull half. Similarly, arms 38 and 39, which are integral, are pinned at 45, and arms 38 and 37 are pinned at 46. As shown in FIG. 2, an identical set of lower arms function identically with the upper arms. A lower right angle set of arms 47 and 48 are controlled by a hydraulic cylinder 49 which has a piston rod 50. On the starboard half, the right-angled arms are indicated by reference characters 51 and 52, the hydraulic cylinder by reference character 53 and the piston rod of the hydraulic cylinder 53 indicated by reference character 54. As is also evident in FIG. 2, each of the set of arms is retained in a cavity with the upper port chamber being indicated by reference character 55, the upper starboard cavity by reference character 56, the lower port cavity by reference character 57 and the lower starboard cavity by reference character 58. These cavities are an integral part of the hull so that water cannot enter the hull through the cavities.

To improve the stability of the hull halves when the ship is in its normal contracted position, a pair of longitudinal shear plates 59 fit in longitudinal shear plate cavities 61 and 62. The upper longitudinal shear plate 59 can be seen best in FIG. 4, and the upper shear plate cavity 61 is shown in phantom view therein. The aft expandable connection means has a pair of upper port spreader arms 63 and 64 which are controlled by hydraulic cylinder 65 and activated through cylinder rod 66. These are pinned at 67, as shown in FIG. 4, and are connected through a pin 68 to starboard spreader arms 69 and 70. These upper starboard spreader arms are controlled by hydraulic cylinder 71 through piston rod 72. Similarly, the lower spreader arms on the port side in the aft are indicated by reference characters 73 and 74. These are pinned at 75 and operated by a hydraulic cylinder, not shown, through piston rod 76. The lower starboard spreader arms at the aft are indicated by reference characters 77 and 78 and pivot about pin 79 and are operated by a hydraulic cylinder, not shown, through piston rod 80.

Figure 9:
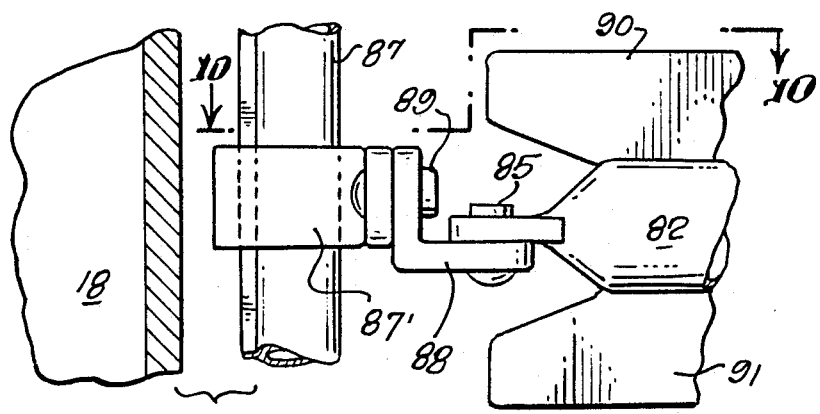
FIG. 9 is an enlarged view of the floating skimmer holding guide.
Figure 10:
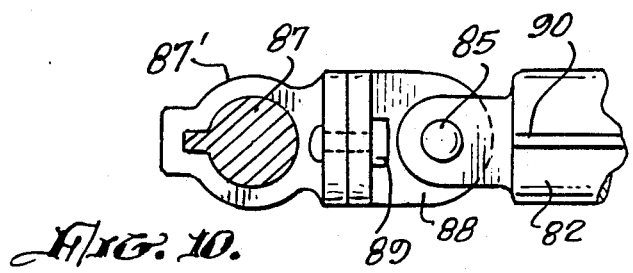
FIG. 10 is a cross-sectional view taken along line 10—10 of FIG. 9.

The skimming action takes place between the hull halves when they are opened as shown in FIG. 4. When the hull halves are closed, the skimmer rests on the deck surfaces 17 and 24. Floating skimmer 32 has a pair of skimmer booms 81 and 82 which are hinged together at 83 and have six closed impeller pumps 84 with a debris screen as shown best in FIG. 8 of the drawings. Skimmer booms 81 and 82 are also hingeably connected at the rear by pins 85 and 86 which are shown best in FIGS. 9 and 10 of the drawings. A pair of vertical shafts guide the skimmer arms, and the port vertical shaft is shown in FIG. 9 and indicated by reference character 87. Shaft 87 is surrounded by a guide collar 87, and a right-angled connection plate 88 holds pin 85 and also holds a second pin 89 which permits the skimmer arm to pivot along the surface of the water.

The skimmer booms 81 and 82 are hollow, as shown in FIG. 8, and float along the surface of the water. Boom 82 has a skimmer override plate 90 and a submerged plate 91 which assist in collecting oil at the surface and preventing it from passing over or under the skimmer booms. Of course, boom 81 has similar override and submerge plates.

In the collecting mode, as shown best in FIG. 4, the skimmer crane 31 lowers the skimmer booms onto the surface of the water which is moving between the hull halves and indicated by reference character 92. The oil, indicated by reference character 93, tends to collect upstream of hinge 83 and is drawn to the closed impeller pumps 84 at the open bottom 94 thereof. Each pump has a motor 95 and a discharge line 96. The closed impeller pumps 84 affixed to boom 82 direct oil and water into the port hull half, and the closed impeller pumps 84 on boom 81 direct oil and water to the starboard hull half.

The oil is separated from the water preferably by a labyrinth of baffles held within the port and starboard hull halves. In this way, a very large volume of oil can be collected without interrupting the operation of the collection vessel. The starboard half is shown in FIG. 5 in plan view, and the oil and water from the three pumps 84 enters through line 96 into a first labyrinth baffle plate. Each baffle plate 125, as shown in FIG. 7, has a lower opening 98 through which the majority of water passes and a small vent hole 99 near the top thereof. Thus, oil and water moves from chamber 97 to chambers 100, 101, 102 and 103. These five chambers form a first level 104 of transverse separation chambers. These five chambers are shown in cross-sectional view from the stern in FIG. 6, and the oil layers are indicated by reference character 105. The heavier, or water ladened, portion of the mixture in level 104 passes into level 106 through pipe 107. The separation in level 106 is identical to that in 104, and the heavier portions of the mixture pass through pipe 108 to level 109 and, similarly, through pipe 110 to level 111. As water continues to pass through pipe 112 into level 113 and through pipe 114 into 115, further separation takes place. As the earlier levels become oil ladened, a larger percentage of oil will pass into the next forward area, and when the entire starboard hull half is almost completely oil filled, a substantial amount of oil will pass through pipe 116 to level 117 through pipe 118 into level 119 and, lastly, into the last chamber 120 through pipe 121. A water outlet pipe 122 has a discharge 123 which is located in the area between the hull halves so that any oil which inadvertently escapes through pipe 122 will, again, be collected by the skimmer and forced to again pass through the labyrinth. When the hull halves are almost completely oil filled, the ship is off loaded, and the oil is pumped out of the hull to an oil barge or other collection vessel thus becoming operational again.

The oil spill recovery vessel of the present invention has the substantial advantage of being able to be rapidly deployed to an oil spill since it is highly seaworthy when it is in a closed configuration as shown in FIG. 1. Furthermore, it has a very large oil storage capacity so that it may operate for a long period of time without interruption. It is highly maneuverable and can be operated at a speed which will completely collect all the oil over a wide swath. It is contemplated that the ship would be about 175 to 200 feet long with a beam of about 50 feet and have an oil holding capacity of at least 20,000 barrels and a deck to hull dimension of 30 feet.

The construction of the bridge so that it is held to only one of the hull halves provides exceptional visibility in that an operator can be placed in a portion of the bridge between the two hull halves during operation to assure optimum control of speed and direction of the ship from a position almost directly above the collecting area.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An oil spill recovery vessel for removing oil spills from the water surface and storing the collected oil, said vessel comprising:
    a first hull half including a bow, a stern, a bottom, an outer side, and an inner side, said first hull half being watertight and including propeller, rudder and diesel engine means and including means for separating oil from water and for expelling separated water therefrom;
    a second hull half movably connected to said first hull half, said second hull half also including a bow, a stern, a bottom, an outer side, and an inner side, said second hull half being watertight and including propeller, rudder and diesel engine means;
    expandable connection means affixed to said first hull half and to said second hull half, said expandable connection means having a contracted position wherein said first hull half and said second hull half are tightly held together and an expanded position wherein said first hull half and said second hull half are completely separated both at the bow and at the stern so that water and oil may pass between the hull halves with little disturbance;
    deployable oil skimming means positionable between said first hull half and said second hull half when said expandable connection means is in an expanded position, said deployable oil skimming means having a water and oil inlet located between said first and second hull halves and at least one water and oil outlet located within said means for separating oil from water in said first hull half.

2. The oil spill recovery vessel of claim 1 wherein said second hull half also includes means for separating oil from water and for expelling separated water therefrom and wherein said deployable oil skimming means has a water and oil outlet located within said means for separating oil from water in both the first and second hull halves.

3. The oil spill recovery vessel of claim 2 wherein said means for separating oil from water includes a separated oil storage area.

4. The oil spill recovery vessel of claim 3 wherein said separated water outlet is located between said hull halves near the bows thereof.

5. The oil spill recovery vessel of claim 1 wherein said first and second hull halves are approximately parallel to one another when said expandable connection means are in an expanded position.

6. The oil spill recovery vessel of claim 1 wherein said vessel has a bridge which extends over both the first and second hull halves when the expandable connection means is in a contracted position, and wherein said bridge is affixed only to one of said first or second halves so that when the expandable connection means is in an expanded position, a portion of the bridge is positioned over the space between the hull halves.

7. An oil spill recovery vessel for removing oil spills from the surface of the water and storing the collected oil, said vessel comprising:
    a starboard hull half including a bow, a stern, a bottom, an outer side, and an inner side, said starboard hull half being watertight and including propeller, rudder and diesel engine means and including means for separating oil from water and for expelling separated water therefrom;
    a port hull half movably connected to said starboard hull half, said port hull half also including a bow, a stern, a bottom, an outer side, and an inner side, said port hull half being watertight and including propeller, rudder and diesel engine means and including means for separating oil from water and for expelling separated water therefrom, said port hull half being approximately a mirror image of the starboard hull half;
    expandable connection means affixed to said starboard hull half and to said port hull half, said expandable connection means having a contracted position wherein said starboard hull half and said port hull half are tightly held together and an expanded position wherein said starboard hull half and said port hull half are completely separated both at the bow and at the stern so that water may pass between the hull halves;
    deployable oil skimming means positionable between said starboard hull half and said port hull half near the sterns thereof when said expandable connection means is in an expanded position, said deployable oil skimming means having a water and oil inlet located between said starboard and port hull halves near the stern and water and oil outlets located within said means for separating oil from water in said starboard hull half and said port hull half.

8. The oil spill recovery vessel of claim 7 wherein said expandable connection means comprises a set of hydraulically operated forward upper spreader arms, a set of hydraulically operated forward lower spreader arms, a set of hydraulically operated aft upper spreader arms and a set of hydraulically operated aft lower spreader arms.

9. The oil spill recovery vessel of claim 8 wherein each of said sets of hydraulically operated spreader arms has two angled arms hinged at the middle.

10. The oil spill recovery vessel of claim 7 wherein said means for separating oil from water include labyrinth oil and water separation chambers.

11. The oil spill recovery vessel of claim 10 wherein said labyrinth oil and water separation chambers generally direct the water from the stern to near the bow of each hull half.

12. The oil spill recovery vessel of claim 7 wherein said starboard and port hull halves have an upper deck, and said oil skimming means are constructed and arranged to be stored above the upper decks when the expandable connection means is in a contracted position, and to be lowered between the hull halves when the expandable connection means is in an expanded position.

13. The oil spill recovery vessel of claim 7 wherein said starboard and port hull halves have interlocking shear plates and cavities to assist in holding the hull halves together when the expandable connection means is in a contracted position.

14. The oil spill recovery vessel of claim 7 wherein said deployable skimming means is a floating skimmer and includes a plurality of closed impeller pumps affixed thereto.

15. The oil spill recovery vessel of claim 14 wherein said floating skimmer has a pair of floating booms, each floating boom including a skimmer override plate extending upwardly from the floating boom and a submerged baffle plate extending downwardly therefrom.

* * * * *